2 Sheets—Sheet 1.
R. R. BALL.
Gas Regulator.
No. 214,081. Patented April 8, 1879.
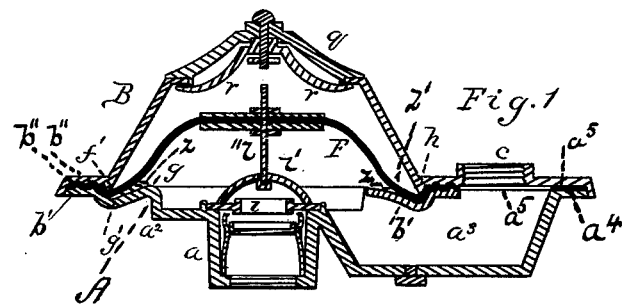
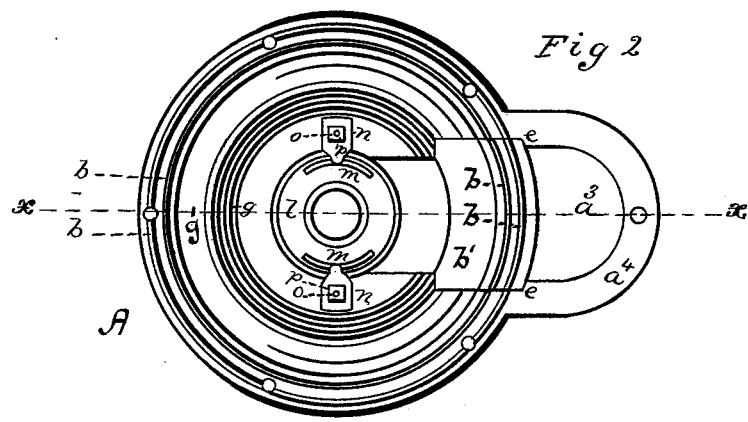
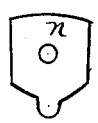
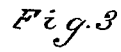
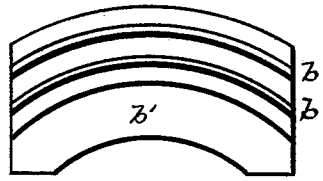
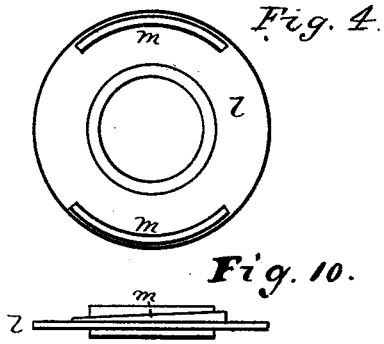
Witnesses:
C. Fenton
Will R. Omohundro.
Inventor
Robert R. Ball
By Myers & ...
Atty.
N. PETERS, PHOTO-LITHOGRAPHER, WASHINGTON, D. C.

R. R. BALL.
Gas Regulator.
No. 214,081. Patented April 8, 1879.
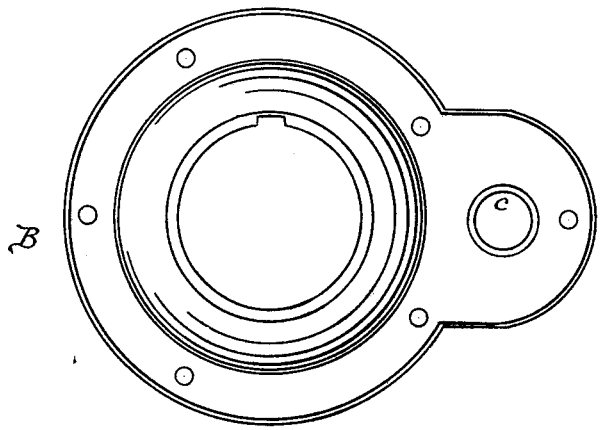
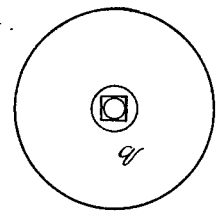
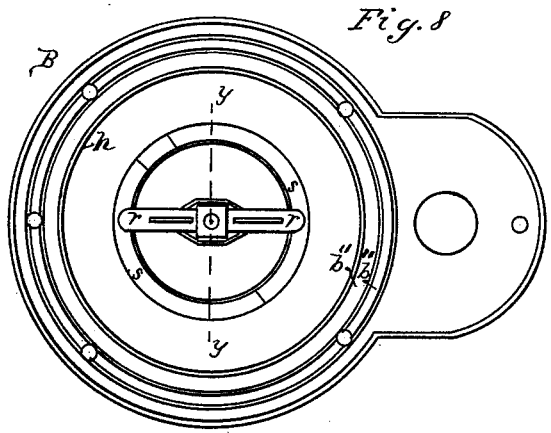
Witnesses
Inventor

UNITED STATES PATENT OFFICE.

ROBERT R. BALL, OF WEST MERIDEN, CONNECTICUT.

IMPROVEMENT IN GAS-REGULATORS.

Specification forming part of Letters Patent No. 214,081, dated April 8, 1879; application filed February 19, 1879.

*To all whom it may concern:*

Be it known that I, ROBERT R. BALL, of West Meriden, in the county of New Haven and State of Connecticut, have invented certain new and useful Improvements in Gas-Regulators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a section taken on a vertical plane through the center of the regulator. Said plane is indicated by dotted lines $x\,x$, Fig. 2. Fig. 2 is a top or plan view of the body with the covering removed. Fig. 3 is an enlarged view of the segmental ribbed piece $b'$, which is let into the body of the regulator. Fig. 4 is an enlarged view of the valve-seat. Fig. 5 is an enlarged view of one of the plates which hold the valve-seat in place. Fig. 6 is a top or plan view of the covering with the cap $q$ removed, and Fig. 7 shows such cap detached. Fig. 8 is a plan view of the under side of the covering with the cap $q$ secured in position. Fig. 9 is a section of said cap, taken on the line $y\,y$, Fig. 8. Fig. 10 is an edge view of Fig. 4.

My invention relates to that class of gas-regulators in which a flexible diaphragm and automatically-operating valve are employed for the purpose of regulating the flow of gas to the gas-burner; and my improvement consists in certain peculiarly-constructed parts and combinations thereof, as will best be understood by the following description of a gas-regulator embodying my improvements, and by the claims, which specifically point out the features which I regard as new.

Referring by letter to the accompanying drawings, A represents the body, and B the covering, of the gas-regulator. Both the body and the covering are made of cast-iron, and are constructed so as to be molded and cast without coring. The body is composed of a lower cylindrical part, $a$, having a rim or flange portion, $a^2$, and hollow projecting arm $a^3$, formed with the flange $a^4$ around its upper edge.

Upon the rim $a^2$, and near its periphery, are two concentric ribs, $b\,b$, which correspond with grooves $b''\,b''$, as shown in Fig. 8 of the drawings, formed in the rim or flange portion of the cover.

The hollow arm constitutes a passage-way for the gas from the interior of the regulator to an outlet, $c$, formed in the covering.

To preserve the continuity of the rib portion of the flange, which is intercepted by this passage, I form separately a segmental piece, $b'$, having two concentric ribs, $b\,b$, formed thereon. This segmental piece is seated within the depressions $e\,e$, as shown. In this way a continuous ring and bearing for clamping the edges of the diaphragm F is formed. I also form a bearing for the diaphragm by raising the bead $g$ in the body or rim, which bead, in connection with the depression $g'$, forms a receptacle to hold oil, as at $z$.

When the flexible diaphragm F is seated in position, and the cover applied over the same, the ribs upon the rim of the body compress the diaphragm into the grooves formed in the body and in the cover, thereby effectively clamping the same and preventing all leakage of gas.

The bead $h$ on the cover serves to hold the diaphragm F by fitting into a depression, $g'$, in the rim of the body of the regulator. It also serves to depress the diaphragm, as shown in Fig. 1.

Oil is placed in the depression $g'$, as will be seen at $z$, Fig. 1. After the several parts of the device are fitted together, the flexible diaphragm will gradually absorb the said oil; but it will be seen from this figure that the conformation of parts would admit of oil being retained in like manner above the diaphragm, as at $z'$, it being placed there after the diaphragm has been crimped by pressing the body and cover together with the diaphragm between them, and then removing the cover and pouring oil into the space between the diaphragm and cover. After this the cover would be replaced. However, the essential feature is the depression $g'$ and raised bead $g$. In this way the diaphragm will, at all times, be kept well oiled, soft, and pliable.

The valve-seat $l$ is so constructed that it is held firmly in position without screw-thread or solder; and to this end it is formed with inclined lugs *m m*, which, when the said seat is set in proper position, come under plates *n n*, which are adjusted upon the screw-rods *o o* by the nuts *p p*, and brought to bear down upon the inclined lugs.

The cap *q* is fastened to the cover by means of a cross-bar, *r r*, which engages with inclines *s s*, formed upon the cover. The cap and cross-bar or fastening are cast separately, and joined together by a bolt and nut.

By this construction I avoid coring and the consequent labor of cutting off a burr or wing. The diaphragm F is crimped at the points *f'*, thereby making a receptacle to contain oil, which, being absorbed by the diaphragm, always keeps it soft and pliable.

A washer-strip, $a^5$, is adjusted in position between the elongated portion of the covering and the rim which surrounds the upper portion of the hollow arm or passage-way, thereby rendering a tight joint.

In operation, the gas flows into the regulator through an opening in the lower portion of the body, and is regulated in its passage through the same to the hollow arm by means of the flexible diaphragm F and valve *l'*, which is connected to said diaphragm by means of the valve-stem *l''*, as usual in gas-regulators.

I do not wish to be understood as claiming a flexible diaphragm and automatically-operating valve for regulating the flow of gas to the gas-burner, so as to produce a steady pressure, and thereby avoiding the usual flicker incident to burners not supplied with the regulator; but

What I claim, and desire to secure by Letters Patent, is—

1. In a gas-regulator, the body A, formed with the bead *g*, concentric ribs *b b*, and recessed for the reception of a separate segmental piece, substantially as shown and described.

2. In a gas-regulator, the separate segmental piece *b'*, in combination with the body A, having a ribbed rim, substantially as shown and described.

3. In a gas-regulator, the body A, formed with the hollow arm $a^3$, and segmental pieces *b'*, seated in said body, in combination with the clamping-cover, having an elongated portion which covers the passage in said arm, and which is also formed with an outlet-passage for the gas, substantially as shown and specified.

4. In a gas-regulator, the herein-described valve-seat, formed with inclined lugs, and secured in position by plates, substantially as shown and described.

5. In a gas-regulator, the combination of the body A, clamping-cover B, valve-seat secured by plates; also, the valve *l'* and flexible diaphragm, substantially as shown and specified.

In testimony that I claim the foregoing as my own I affix my signature in presence of two witnesses.

ROBERT R. BALL.

Witnesses:
 FRANK S. FAY,
 BENJ. PAGE.